(12) United States Patent
Song et al.

(10) Patent No.: US 11,436,198 B2
(45) Date of Patent: Sep. 6, 2022

(54) METHOD AND DEVICE FOR RESTORING BLOCKCHAIN NETWORK WITH ITS CREDIBILITY ON BACKUP DATA MAINTAINED BY USING DELAYED SYNCHRONIZATION

(71) Applicant: Metabora Co., Ltd., Seongnam-si (KR)

(72) Inventors: Gye Han Song, Seongnam-si (KR); I Goo Lee, Seoul (KR)

(73) Assignee: Metabora Co., Ltd., Seongnam-si (KR)

( * ) Notice: Subject to any disclaimer, the term of this patent is extended or adjusted under 35 U.S.C. 154(b) by 259 days.

(21) Appl. No.: 16/850,268

(22) Filed: Apr. 16, 2020

(65) Prior Publication Data

US 2020/0334212 A1    Oct. 22, 2020

(30) Foreign Application Priority Data

Apr. 18, 2019    (KR) .................... 10-2019-0045767

(51) Int. Cl.
*G06F 16/00*    (2019.01)
*G06F 16/178*    (2019.01)
*G06F 16/182*    (2019.01)

(52) U.S. Cl.
CPC ...... *G06F 16/1787* (2019.01); *G06F 16/1837* (2019.01)

(58) Field of Classification Search
CPC ... G06F 16/1787; G06F 16/1837; H04L 9/12; H04L 2209/38; H04L 9/3239; H04L 67/1095; H04L 41/0856
See application file for complete search history.

(56) References Cited

U.S. PATENT DOCUMENTS

2019/0058709 A1*  2/2019 Kempf .............. H04L 63/0876
2019/0220603 A1*  7/2019 Gopalakrishnan ...... G06F 21/64
(Continued)

FOREIGN PATENT DOCUMENTS

CN    108134706 A  *  6/2018    ......... H04L 41/0659
KR    100891036 B1     3/2009
(Continued)

OTHER PUBLICATIONS

Feng et al. "Scalable Dynamic Multi-Agent Practical Byzantine Fault-Tolerant Consensus in Permissioned Blockchain." Oct. 2018. <https://www.mdpi.com/2076-3417/8/10/1919/pdf/1> (Year: 2018).*

*Primary Examiner* — Syed H Hasan
(74) *Attorney, Agent, or Firm* — Young Basile Hanlon & MacFarlane, P.C.

(57) ABSTRACT

A method for synchronizations with delayed data serving as backup data stored in one or more delayed nodes in a blockchain network, to thereby restore one or more service nodes in the blockchain network while maintaining a reliability of the backup data is provided. The method includes steps of: (a) a specific delayed node among the delayed nodes performing synchronization with the services nodes while the specific delayed node maintains a specific delay according to a specific initial setting thereof; (b) the specific delayed node, when a triggering command is acquired from an administrating device, transmitting information on delayed blocks included therein to the service nodes in order to support restoration of the service nodes; and (c) the specific delayed node, after the service nodes are restored by using the information on the delayed blocks, performing the synchronization again with the service nodes.

12 Claims, 4 Drawing Sheets

(56) References Cited

U.S. PATENT DOCUMENTS

2019/0236302 A1* 8/2019 Czerkowicz .......... H04L 9/3247
2020/0322136 A1* 10/2020 Irazabal ................ H04L 9/3239

FOREIGN PATENT DOCUMENTS

| KR | 20090062106 A | 6/2009 | |
|----|---------------|--------|---|
| KR | 20180085570 A | 7/2018 | |
| WO | WO-2018177190 A1 * | 10/2018 | ......... H04L 67/1095 |

* cited by examiner

METHOD AND DEVICE FOR RESTORING BLOCKCHAIN NETWORK WITH ITS CREDIBILITY ON BACKUP DATA MAINTAINED BY USING DELAYED SYNCHRONIZATION

CROSS-REFERENCE TO RELATED APPLICATION

This application claims priority to Korean Application Patent Serial No. 10-2019-0045767, filed Apr. 18, 2019 the entire disclosure of which is hereby incorporated by reference.

TECHNICAL FIELD

The present disclosure relates to a method and device for synchronizations with delayed data; and more particularly, to the method for the synchronizations with the delayed data stored in delayed nodes in a blockchain network, to thereby restore service nodes in the blockchain network while maintaining a reliability of backup data.

BACKGROUND

Blockchain technology is a technology aimed to prevent data tampering based on distributed computing technology, by storing target data in blocks, which is a chain-distributed data store based on a P2P method.

The blockchain technology restricts data recorded in the blocks from being revised in order to prevent the data tampering, however, if an error occurs caused by a service problem, the restriction also makes it difficult to fix the error in the data recorded in the blocks. Since fixing the error only cannot be an option due to above-mentioned characteristics of the blockchain technology, another option of restoration using backup data right before the error and synchronization again is the only way to adopt.

As examples of methods of using the backup data, conventional backup methods such as a method of stopping synchronization at a specific point of time and processing a cold backup on an OS level, and a method of backing up information for a specific block or a specific section comprised of one or more blocks can be considered, however, these methods have disadvantages of less reliability on the backup data and long restoring time.

In this regard, a solution that can effectively restore blocks back to the point of time before the error occurs while maintaining the reliability of backup data is needed, but the research on the solution has not been done enough yet.

SUMMARY

It is an object of the present disclosure to solve the aforementioned problems.

It is another object of the present disclosure to provide a method for synchronizations with delayed data serving as backup data stored in one or more delayed nodes in a blockchain network, to thereby restore one or more service nodes in the blockchain network while maintaining a reliability of the backup data.

It is still another object of the present disclosure to provide a prompt and easy method for the synchronizations with the delayed data serving as the backup data stored in the delayed nodes in the blockchain network, to thereby restore the service nodes in the blockchain network while maintaining the reliability of the backup data for an administrator.

In accordance with one aspect of the present disclosure, there is provided a method for synchronizations with delayed data serving as backup data stored in one or more delayed nodes in a blockchain network, to thereby restore one or more service nodes in the blockchain network while maintaining a reliability of the backup data, including steps of: (a) a specific delayed node among the delayed nodes performing delayed synchronization, wherein the delayed synchronization represents synchronization with the services nodes while the specific delayed node maintains a specific delay according to a specific initial setting thereof; (b) the specific delayed node, when a triggering command is acquired from an administrating device, transmitting information on delayed blocks included therein to the service nodes in order to support restoration of the service nodes; and (c) the specific delayed node, after the service nodes are restored by using the information on the delayed blocks, performing the delayed synchronization again with the service nodes.

As one example, at the step of (b), the specific delayed node, by referring to a restoration reference block number in the triggering command and a recent delayed block number, wherein the restoration reference block number represents the number of a most recent block before an error occurs, in the service nodes, and wherein the recent delayed block number represents the number of a most recent block of the specific delayed node, performs (i) a process of stopping the delayed synchronization and transmitting the information on the delayed blocks included in the specific delayed node to the service nodes in a first case, wherein the first case represents a case in which the restoration reference block number corresponds to the recent delayed block number, and (ii) a process of stopping the delayed synchronization, performing additional synchronization with the service nodes, and transmitting information on incorporated blocks to the service nodes in a second case, wherein the second case represents a case in which the restoration reference block number is bigger than the recent delayed block number, wherein the additional synchronization represents synchronization with the service nodes by obtaining additional blocks comprised of from a subsequent block of the recent delayed block to the restoration reference block, and wherein the incorporated blocks represent blocks comprised of the delayed blocks of the specific delayed node and the additional blocks.

As one example, at the step of (b), in the second case, during the process of performing the additional synchronization with the service nodes, the specific delayed node acquires the additional blocks from the service nodes.

As one example, at the step of (b), the specific delayed node performs (i) a process of stopping the delayed synchronization and transmitting the information on the delayed blocks included therein to the service nodes in a first case, wherein the first case represents a case in which the triggering command includes, as the triggering command, an instruction for data transmission without an instruction for the additional synchronization, and (ii) a process of stopping the delayed synchronization, performing, by referring to a restoration reference block number in the triggering command, additional synchronization, and transmitting information on incorporated blocks to the service nodes in a second case, wherein the second case represents a case in which the triggering command includes, as the triggering command, both the instruction for the data transmission and the instruction for the additional synchronization, wherein the restoration reference block number represents the number of a most recent block before an error occurs, in the service nodes, wherein the additional synchronization represents synchronization with the service nodes by obtaining additional blocks comprised of from a subsequent block of a most recent block of the specific delayed node to the restoration reference block, and wherein the incorporated blocks represent blocks comprised of the delayed blocks of the specific delayed node and the additional blocks.

As one example, each of the delayed nodes is set by the administrating device to have each of delays, and wherein the administrating device restores the blockchain network by transmitting the triggering command to at least one of the delayed nodes.

In accordance with another aspect of the present disclosure, there is provided a method for synchronizations with delayed data serving as backup data stored in one or more delayed nodes in a blockchain network, to thereby restore one or more service nodes in the blockchain network while maintaining a reliability of the backup data, including steps of: (a) a specific service node among the service nodes stopping routine synchronization among the service nodes when a first triggering command is acquired from the administrating device; (b) after at least one specific delayed node among the delayed nodes acquires a second triggering command from the administrating device and, in response to the second triggering command, the specific delayed node transmits the information on the delayed blocks to the service nodes, the specific service node, by referring to a restoration reference block number in the second triggering command and a recent delayed block number, wherein the restoration reference block number represents the number of a most recent block before an error occurs, in the service nodes, and wherein the recent delayed block number represents the number of a most recent block of the specific delayed node, acquiring (i) the information on the delayed blocks from the specific delayed node in a first case, wherein the first case represents a case in which the restoration reference block number corresponds to the recent delayed block number, and (ii) information on the incorporated blocks in a second case, wherein the second case represents a case in which the restoration reference block number is bigger than the recent delayed block number, and wherein the incorporated blocks represent blocks comprised of the delayed blocks of the specific delayed node and from a subsequent block of the recent delayed block number to the restoration reference block, to thereby complete an updated data chain; and (c) the specific service node restarting the routine synchronization when a third triggering command is acquired from the administrating device.

As one example, at the step of (b), the specific service node performs one of processes of (i) initializing itself, and performing restoration synchronization, to thereby complete the updated data chain, wherein the restoration synchronization represents synchronization with the specific delayed node to restore the specific service node by acquiring information on either the delayed blocks or the incorporated blocks, and (ii) initializing itself, and acquiring, by using commands supported on each of operating systems of the specific service node and the specific delayed node, information on data and structure of either the delayed blocks or the incorporated blocks interlocked with one another in a form of a linked list, to thereby create the updated data chain.

In accordance with still yet another aspect of the present disclosure, there is provided a specific delayed node, among one or more delayed nodes in a blockchain network, which performs synchronizations with delayed data serving as backup data stored in the delayed nodes, to thereby restore one or more service nodes in the blockchain network while maintaining a reliability of the backup data, including: at least one memory that stores instructions; and at least one processor configured to execute the instructions to perform or support another device to perform: (I) a process of performing delayed synchronization, wherein the delayed synchronization represents synchronization with the services nodes while the processor maintains a specific delay according to a specific initial setting thereof, (II) a process of, when a triggering command is acquired from an administrating device, transmitting information on delayed blocks included therein to the service nodes in order to support restoration of the service nodes, and (III) a process of, after the service nodes are restored by using the information on the delayed blocks, performing the delayed synchronization again with the service nodes.

As one example, at the process of (II), the processor, by referring to a restoration reference block number in the triggering command and a recent delayed block number, wherein the restoration reference block number represents the number of a most recent block before an error occurs, in the service nodes, and wherein the recent delayed block number represents the number of a most recent block of the specific delayed node, performs (i) a process of stopping the delayed synchronization and transmitting the information on the delayed blocks included in the specific delayed node to the service nodes in a first case, wherein the first case represents a case in which the restoration reference block number corresponds to the recent delayed block number, and (ii) a process of stopping the delayed synchronization, performing additional synchronization with the service nodes, and transmitting information on incorporated blocks to the service nodes in a second case, wherein the second case represents a case in which the restoration reference block number is bigger than the recent delayed block number, wherein the additional synchronization represents synchronization with the service nodes by obtaining additional blocks comprised of from a subsequent block of the recent delayed block to the restoration reference block, and wherein the incorporated blocks represent blocks comprised of the delayed blocks of the specific delayed node and the additional blocks.

As one example, at the process of (II), in the second case, at the process of (II), in the second case, during the process of performing the additional synchronization with the service nodes, the processor acquires the additional blocks from the service nodes.

As one example, at the process of (II), the processor performs (i) a process of stopping the delayed synchronization and transmitting the information on the delayed blocks included therein to the service nodes in a first case, wherein the first case represents a case in which the triggering command includes, as the triggering command, an instruction for data transmission without an instruction for the additional synchronization, and (ii) a process of stopping the delayed synchronization, performing, by referring to a restoration reference block number in the triggering command, additional synchronization, and transmitting information on incorporated blocks to the service nodes in a second case, wherein the second case represents a case in which the triggering command includes, as the triggering command, both the instruction for the data transmission and the instruction for the additional synchronization, wherein the restoration reference block number represents the number of a most recent block before an error occurs, in the service nodes, wherein the additional synchronization represents synchronization with the service nodes by obtaining additional blocks comprised of from a subsequent block of a most recent block of the specific delayed node to the restoration reference block, and wherein the incorporated blocks represent blocks comprised of the delayed blocks of the specific delayed node and the additional blocks.

As one example, each of the delayed nodes is set by the administrating device to have each of delays, and wherein the administrating device restores the blockchain network by transmitting the triggering command to at least one of the delayed nodes.

In accordance with still yet another aspect of the present disclosure, there is provided a specific service node, among one or more service nodes in a blockchain network, which performs synchronizations with delayed data serving as backup data stored in one or more delayed nodes in the blockchain network, to thereby restore the service nodes while maintaining a reliability of the backup data, including: at least one memory that stores instructions; and at least one processor configured to execute the instructions to perform or support another device to perform: (I) a process of stopping routine synchronization among the service nodes when a first triggering command is acquired from the administrating device, (II) after at least one specific delayed node among the delayed nodes acquires a second triggering command from the administrating device and, in response to the second triggering command, the specific delayed node transmits the information on the delayed blocks to the service nodes, a process of, by referring to a restoration reference block number in the second triggering command and a recent delayed block number, wherein the restoration reference block number represents the number of a most recent block before an error occurs, in the service nodes, and wherein the recent delayed block number represents the number of a most recent block of the specific delayed node, acquiring (i) the information on the delayed blocks from the specific delayed node in a first case, wherein the first case represents a case in which the restoration reference block number corresponds to the recent delayed block number, and (ii) information on the incorporated blocks in a second case, wherein the second case represents a case in which the restoration reference block number is bigger than the recent delayed block number, and wherein the incorporated blocks represent blocks comprised of the delayed blocks of the specific delayed node and from a subsequent block of the recent delayed block number to the restoration reference block, to thereby complete an updated data chain, and (III) a process of restarting the routine synchronization when a third triggering command is acquired from the administrating device.

As one example, at the process of (II), the processor performs one of processes of (i) initializing itself, and performing restoration synchronization, to thereby complete the updated data chain, wherein the restoration synchronization represents synchronization with the specific delayed node to restore the specific service node by acquiring information on either the delayed blocks or the incorporated blocks, and (ii) initializing itself, and acquiring, by using commands supported on each of operating systems of the specific service node and the specific delayed node, information on data and structure of either the delayed blocks or the incorporated blocks interlocked with one another in a form of a linked list, to thereby create the updated data chain.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION

Figure 1:
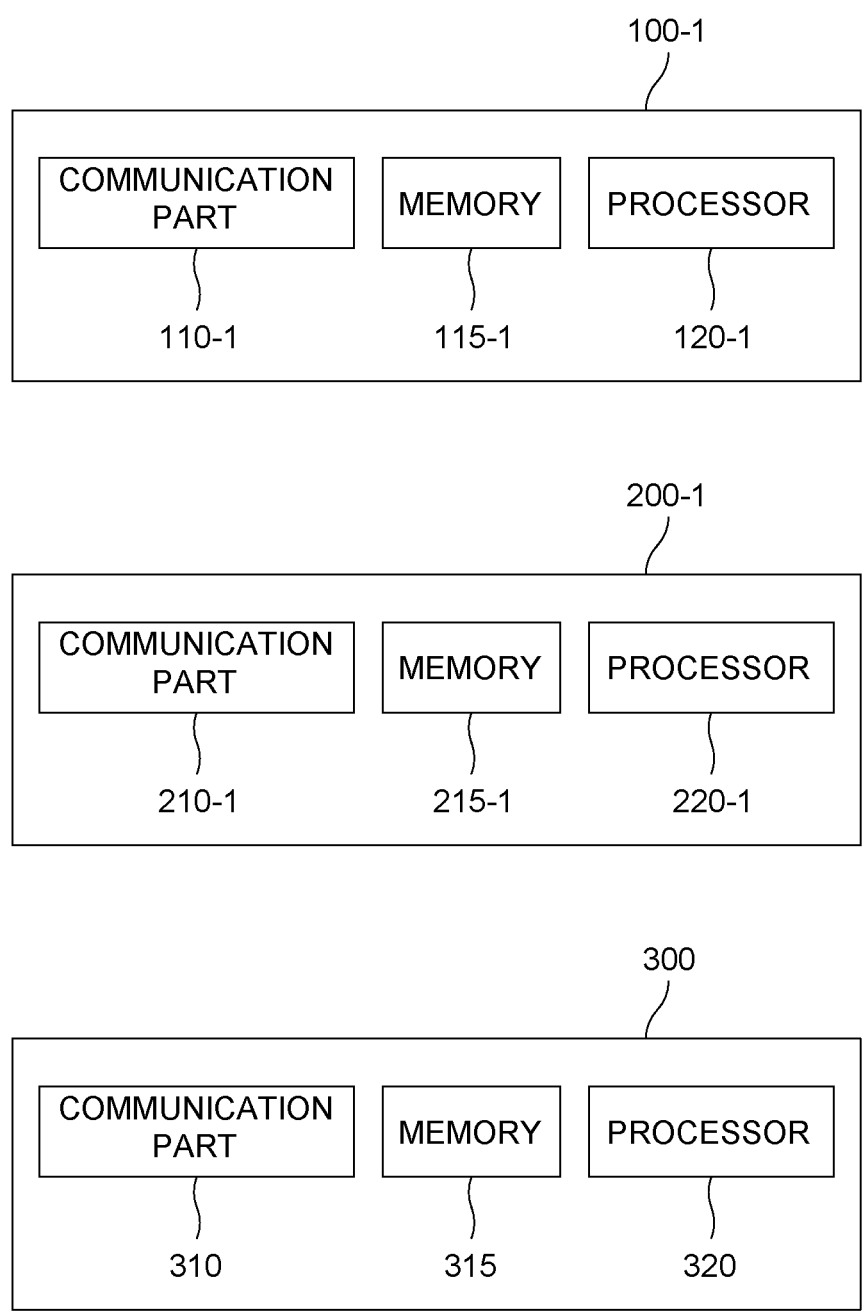
FIG. 1 is a drawing representing a specific delayed node and a specific service node, and an administrating device, which perform a method for synchronizations with delayed data serving as backup data stored in one or more delayed nodes in a blockchain network, to thereby restore one or more service nodes in the blockchain network while maintaining a reliability of the backup data, in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing representing a specific delayed node, a specific service node, and an administrating device, which perform a method for synchronizations with delayed data serving as backup data stored in one or more delayed nodes in a blockchain network, to thereby restore one or more service nodes in the blockchain network while maintaining a reliability of the backup data, in accordance with one example embodiment of the present disclosure.

By referring to FIG. 1, the specific delayed node 100-1, the specific service node 200-1, and the administrating device 300 may respectively include one or more communication parts 110-1, 210-1, 310, one or more processors 120-1, 220-1, 320, and one or more memories 115-1, 215-1, 315. Input and output processes, and operation processes of the specific delayed node 100-1, the specific service node 200-1 and the administrating device 300 may be performed respectively by the communication parts 110-1, 210-1, 310, and the processors 120-1, 220-1, 320. In FIG. 1, detailed explanations of connections among the communication parts 110-1, 210-1, 310 and the processors 120-1, 220-1, 320 are omitted. Herein, the memories 115-1, 215-1, 315 may have been stored with one or more instructions which will be described later, and the processors 120-1, 220-1, 320 may be set to perform the instructions stored in the memories 115-1, 215-1, 315, and the processors 120-1, 220-1, 320 may also carry out the present disclosure by performing processes which will be described later. Even though the specific delayed node 100-1, the specific service node 200-1, and the administrating device 300 are described as seen in the description, the specific delayed node 100-1, the specific service node 200-1, and the administrating device do not exclude cases of including one or more integrated processors, which is a combined form of one or more media, one or more processors, and one or more memories.

Additionally, configurations of other delayed nodes 100-2 to 100-K and other service nodes 200-2 to 200-N, which will be described later in drawings and a description of the present disclosure, may also be identical or similar to those of the specific delayed node 100-1 and the specific service node 200-1, respectively.

Meanwhile, respective functions of the delayed nodes 100-1 to 100-K, the service nodes 200-1 to 200-N, and the administrating device 300 and relationships thereamong are explained below by referring to FIG. 2.

Figure 2:
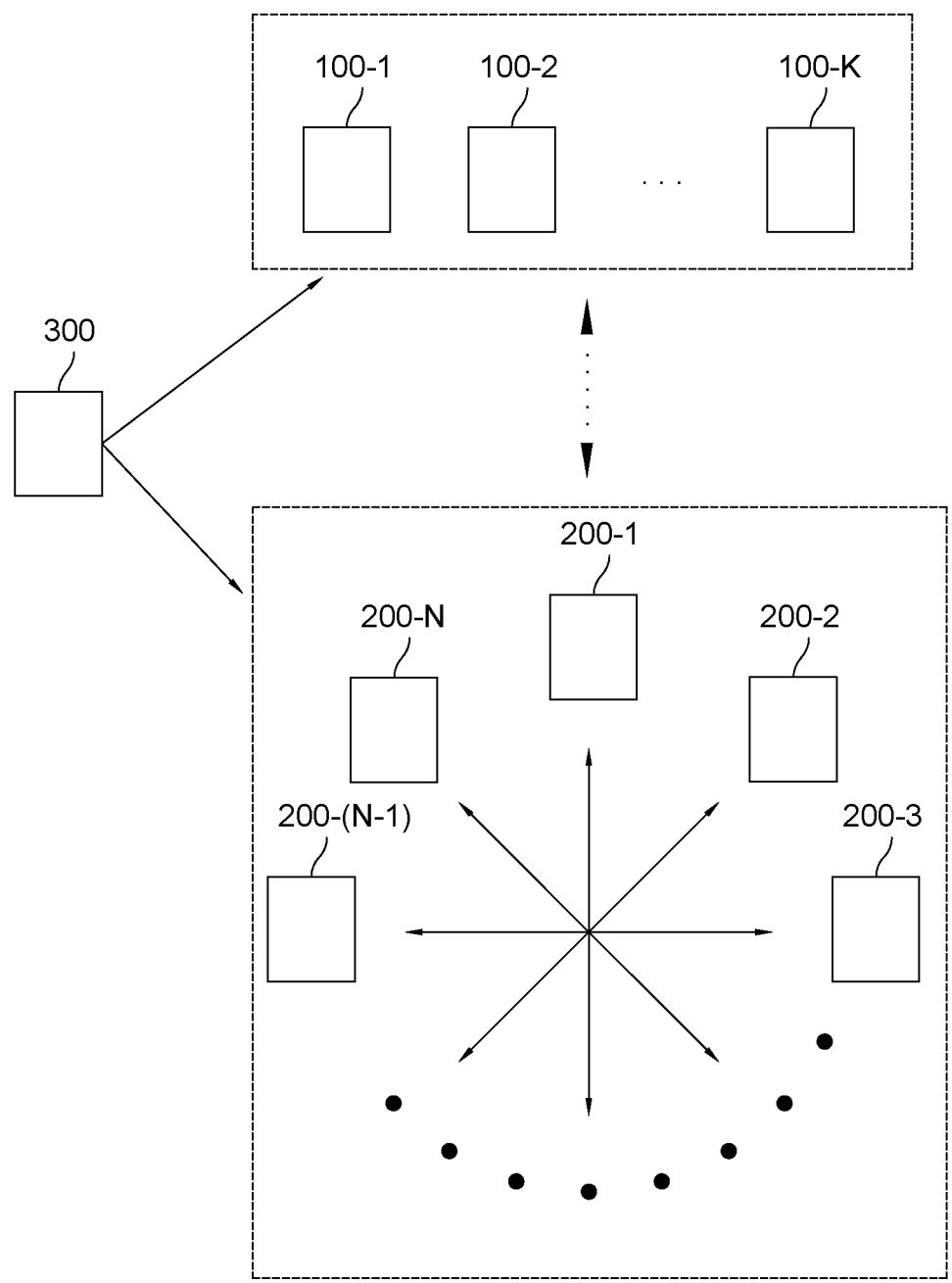
FIG. 2 is a drawing representing a relationship among the delayed nodes and the service nodes which perform the method for the synchronizations with the delayed data, to thereby restore the service nodes while maintaining the reliability of the backup data, in accordance with one example embodiment of the present disclosure.

FIG. 2 is a drawing representing the relationships among the delayed nodes and the service nodes, which perform the method for the synchronizations with the delayed data, to thereby restore the service nodes while maintaining the reliability of the backup data, in accordance with one example embodiment of the present disclosure.

By referring to FIG. 2, the service nodes 200-1 to 200-N may be set to perform their corresponding functions in response to one of triggering commands from the administrating device 300. To be specific, the service nodes 200-1 to 200-N, which are connected with one another as shown in FIG. 2, continuously perform synchronization, create blocks, store the blocks therein respectively to form a distributed data storage environment, and the service nodes 200-1 to 200-N may also be set to perform the specific functions in response to the triggering commands from the administrating device 300. The triggering commands may be manually entered by an administrator using the administrating device 300, or automatically generated by a programed algorithm.

Meanwhile, the delayed nodes 100-1 to 100-K may also be set to perform a specific function in response to one of the triggering commands from the administrating device 300. The difference is that the delayed nodes 100-1 to 100-K perform delayed synchronization with the service nodes 200-1 to 200-N while each of the delayed nodes 100-1 to 100-K maintains its corresponding each of delays according to each of initial settings of each of the delayed nodes 100-1 to 100-K. The delayed nodes 100-1 to 100-K maintain the delays in order to restore the service nodes 200-1 to 200-N by using blocks included in the delayed nodes 100-1 to 100-K, while the blocks are acquired by delayed nodes 100-1 to 100-K from the delayed synchronization. Herein, a detailed process of the delayed nodes 100-1 to 100-K restoring the service nodes 200-1 to 200-N will be described later.

The delayed nodes 100-1 to 100-K may be set to have different delays at a convenience of the administrator. For example, a delayed node may be set to have a delay of the number of blocks corresponding to a day, another delayed node may be set to have a delay of the number of blocks corresponding to 7 days, and still another delayed node may be set to have a delay of the number of blocks corresponding to 30 days. Or, in order to back up data for each day of the week, 7 delayed nodes may be set to have corresponding delays of the number of blocks, e.g., delays of 1 to 7 days. Each of the delays which are set in the delayed nodes 100-1 to 100-K does not necessarily differ from one another. By setting an identical delay among multiple delayed nodes, backup data can be multiplexed. Aforementioned embodiments can be modified according to a circumstance of a service using the blockchain network.

Meanwhile, detailed explanations of a restoration process of the present disclosure is explained below. For the sake of convenience, the blockchain network including the service nodes 200-1 to 200-N and the delayed nodes 100-1 to 100-K is assumed as generating a block per node per second. It is also assumed that there are three delayed nodes 100-1, 100-2, 100-3, which are set to have respective delays of 864000, 604800, and 2592000 blocks, each of which is the numbers of blocks corresponding to a day, 7 days, and 30 days. Although, the restoration process is explained based on the specific delayed node 100-1 and the specific service node 200-1 for the sake of convenience, another delayed node and another service node may perform an identical process when an identical triggering command is acquired.

First, as aforementioned, the specific service node 200-1 performs routine synchronization with other service nodes 200-2 to 200-N, and the specific delayed node 100-1 performs the delayed synchronization while maintaining a delay of 864000 blocks which is the number of blocks corresponding to a day.

Herein, the administrating device 300 may transmit a first triggering command to the service nodes 200-1 to 200-N. To be specific, the administrating device 300 may transmit the first triggering command when the administrator detects an error in a certain block or needs to roll back the blockchain network to a particular point of time. When the first triggering command is acquired, the specific service node 200-1 may stop the routine synchronization with other service nodes 200-2 to 200-N.

Thereafter, the administrating device 300 may transmit a second triggering command to the specific delayed node 100-1. To be specific, the administrating device 300 may choose a delayed node, e.g., the specific delayed node 100-1, among the delayed nodes 100-1 to 100-K and transmit the second triggering command to the specific delayed node. Herein, the choice can be made manually by the administrator or automatically by the administrating device 300. For example, by entering information on which delayed node to choose from the delayed nodes 100-1 to 100-K into the administrating device 300, the administrator may allow the administrating device 300 to transmit the second triggering command to the specific delayed node, or, by entering a certain block number which is a block number of a certain block where the error occurs, administrator may allow the administrating device 300 to refer the certain block number, choose an appropriate delayed node, e.g., the specific delayed node, and transmit the second triggering command to the specific delayed node. In the latter case, the administrating device 300 refers the certain block number and checks a certain point of a time when the certain block is created, chooses the specific delayed node, which is created before the certain point of time and has a most recent delayed block created at the closest point of time to the certain point of time, and sends the second triggering command to the appropriate delayed node.

When the second triggering command is acquired from the administrating device 300, the specific delayed node 100-1 may transmit information on delayed blocks included in the specific delayed node 100-1 to the service nodes 200-1 to 200-N in order to support restoration of the service nodes 200-1 to 200-N. The process of transmitting the information on the delayed blocks to the service nodes 200-1 to 200-N in order to support restoration of the service nodes 200-1 to 200-N has two example embodiments as follows. In detail, in accordance with a first example embodiment, the specific delayed node 100-1 may perform necessary processes by using the second triggering command. Herein, the specific delayed node 100-1 may determine whether the second triggering command corresponds to a first case or a second case.

The first case is a case in which a restoration reference block number corresponds to the recent delayed block number. Herein, the restoration reference block is a most recent block before an error occurs, the restoration reference block number is the number of restoration reference block included in the second triggering command, and the recent delayed block number is the number of a most recent delayed block of the specific delayed node 100-1. By referring to FIG. 3, since the specific delayed node 100-1 has already exact blocks to perform the restoration process, the specific delayed node 100-1 may perform a process of transmitting the information on the delayed blocks therein to the service nodes 200-1 to 200-N.

Figure 3:
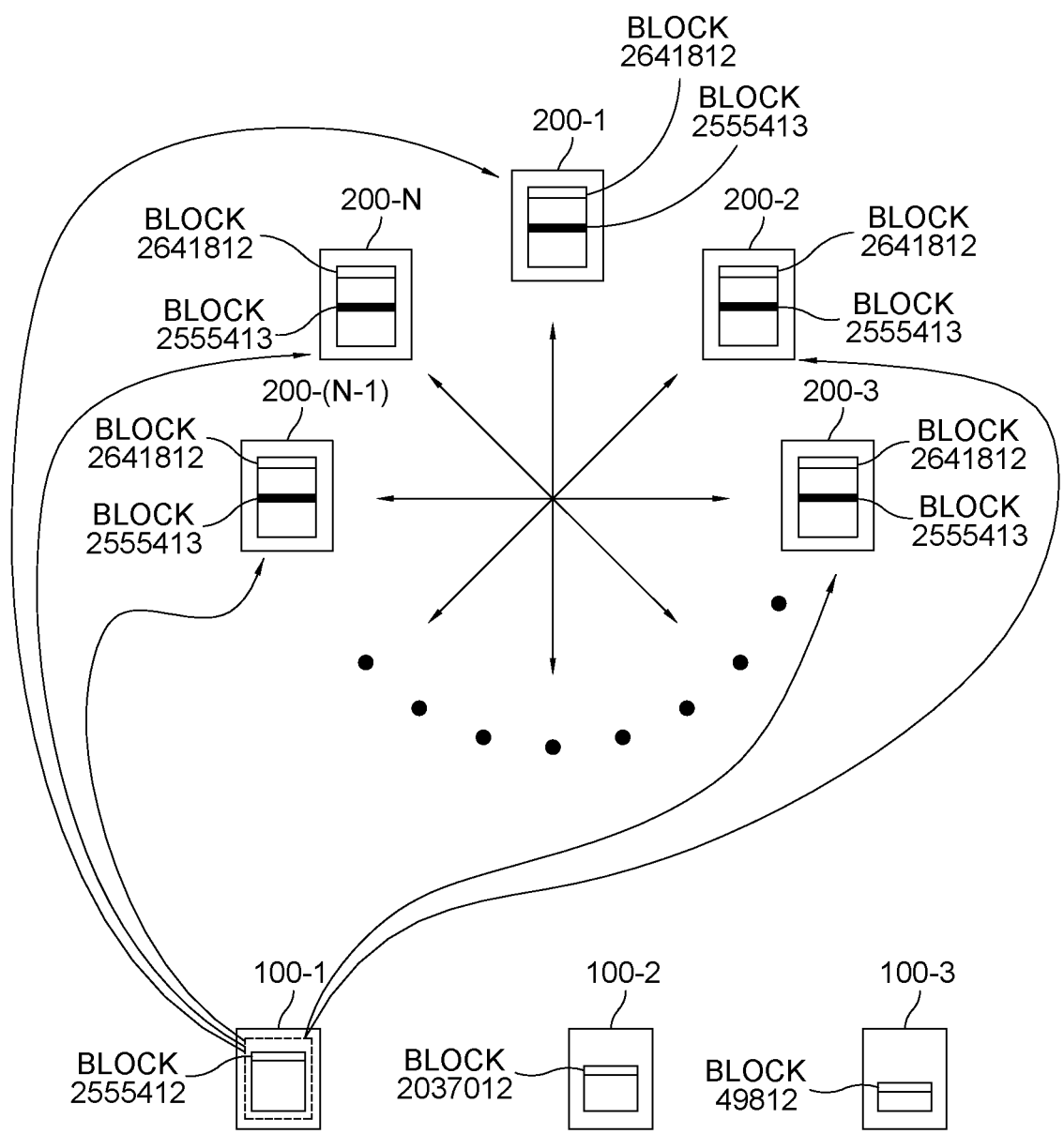
FIG. 3 is a drawing representing an example process of the specific delayed node interacting with the service nodes in a first case, wherein the specific delayed node performs the method for the synchronizations with the delayed data, to thereby restore the service nodes while maintaining the reliability of the backup data, in accordance with one example embodiment of the present disclosure.

FIG. 3 is a drawing representing an example process of the specific delayed node interacting with the service nodes in the first case, wherein the specific delayed node performs the method for the synchronizations with the delayed data, to thereby restore the service nodes while maintaining the reliability of the backup data, in accordance with one example embodiment of the present disclosure.

In FIG. 3, an error occurs in a block 2555413, and a block number of most recent service node is 2641812. Herein, since the synchronization is required to be performed on the basis of a block 2555412, i.e., a most recent block before the error occurs, the administrating device 300 may transmit a second triggering command including the block number 2555412 to the specific delayed node 100-1. Since the restoration reference block number is identical with the recent delayed block number, 2555412, the specific delayed node 100-1 may transmit the information on the delayed blocks therein to the service nodes 200-1 to 200-N. Herein, the recent delayed block number is smaller than a most recent block number of the specific service node 200-1 by 86400.

Meanwhile, the second case is a case in which the restoration reference block number is bigger than the recent delayed block number. Further, by referring to FIG. 4, since the specific delayed node needs more blocks to perform the restoration process, the specific delayed node 100-1 may perform additional synchronization with the service nodes from 200-1 to 200-N to update the specific delayed node by obtaining additional blocks comprised of from a subsequent block of the recent delayed block to the restoration reference block, and transmit the information on both the delayed blocks and the additional blocks to the service nodes 200-1 to 200-N. In the additional synchronization process, by referring to FIG. 4, the specific delayed node 100-1 may obtain the additional blocks by referring to the restoration reference block number.

Figure 4:
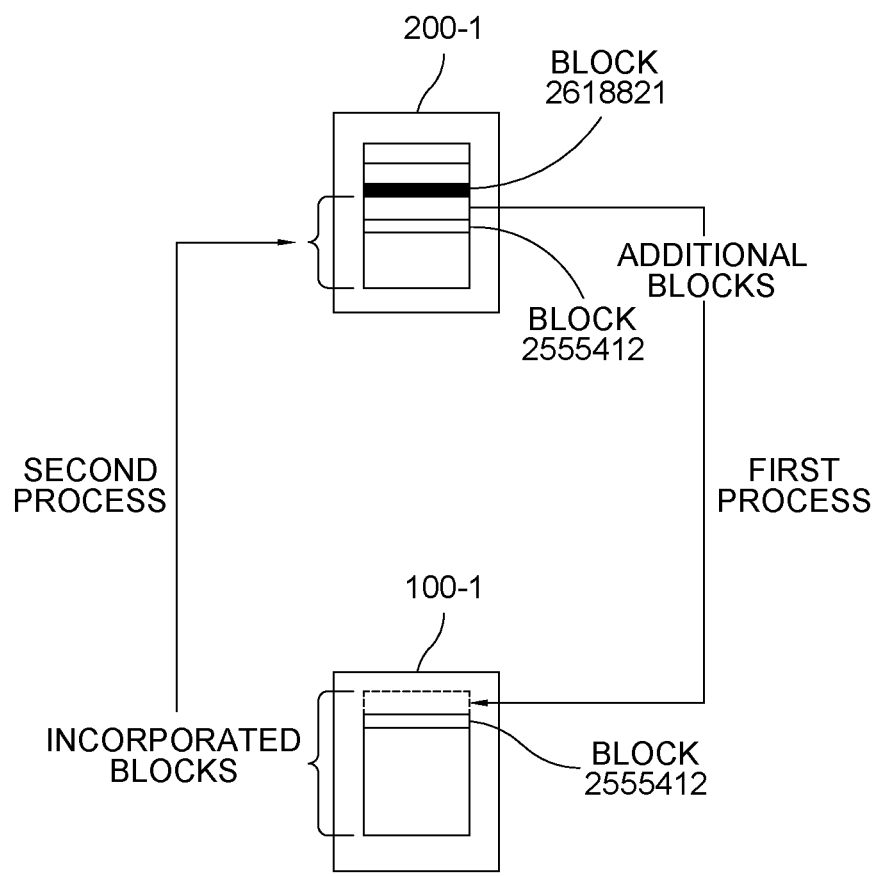
FIG. 4 is a drawing representing an example process of the specific delayed node interacting with the service nodes in a second case, wherein the specific delayed node performs the method for the synchronizations with the delayed data, to thereby restore the service nodes while maintaining the reliability of the backup data, in accordance with one example embodiment of the present disclosure.

FIG. 4 is a drawing representing an example process of the specific delayed node interacting with the service nodes in the second case, wherein the specific delayed node performs the method for the synchronizations with the delayed data, to thereby restore the service nodes while maintaining the reliability of the backup data, in accordance with one example embodiment of the present disclosure.

In FIG. 4, an error occurs in a certain block with a block number 2618821, and a block number of most recent service node is 20641812. Herein, since the synchronization is required to be performed on the basis of a block 2618820, i.e., a most recent block before the error occurs, the administrating device 300 may transmit a second triggering command including a block number 2618820 to the specific delayed node 100-1. Since the restoration reference block number is bigger than the recent delayed block number 2555412, the specific delayed node 100-1 may obtain additional blocks comprised of from a block 2555413 to the block 2618820, and transmit the information on incorporated blocks comprised of the specific delayed blocks and the additional blocks, e.g., a block 1 to the block 2618820, to the service nodes 200-1 to 200-N.

After obtaining the information on the incorporated blocks, the specific delayed node 100-1 may create an updated data chain by using the information on the incorporated blocks, and when a third triggering command is acquired from the administrating device 300, the specific delayed node 100-1 may restart the delayed synchronization. After transmitting the information on the incorporated blocks of the specific delayed node 100-1 to the service nodes 200-1 to 200-N, the specific delayed node may restart the delayed synchronization. When the delayed synchronization among the service nodes 200-1 to 200-N and the delayed nodes 100-1 to 100-K is restarted as aforementioned, the blockchain network may be rolled back to a point of time selected necessarily.

To be specific, an aforementioned process of creating the updated data chain has two sub-example embodiments as follows. In a first sub-example embodiment, the specific service node 200-1 initializes itself, and performs synchronization with the specific delayed node 100-1 to thereby complete the updated data chain. In simple terms, the first sub-example embodiment may present a process of the specific service node 200-1 performing synchronization based on the specific delayed node 100-1. In a second sub-example embodiment, the specific service node 200-1 initializes itself, and, by using commands supported on each of operating systems of the specific service node 200-1 and the specific delayed node 100-1, acquires information on data and structure of either the delayed blocks or the incorporated blocks interlocked with one another in a form of a linked list to thereby create the updated data chain. In simple terms, the second sub-example embodiment may present a process of the specific service node 200-1 copying blocks as-is in the specific delayed node 100-1 and pasting them to the specific service node 200-1. Either way will work.

Meanwhile, in accordance with a second example embodiment, the administrator manually enters commands to perform necessary process.

Herein, the administrator may enter detail processes, which the specific delayed node 100-1 will perform, directly to the administrating device 300. A form of the second triggering command may differ from that of the second triggering command in the first example embodiment. To be specific, the second triggering command may include an instruction for data transmission without an instruction for the additional synchronization, or both the instruction for the data transmission and the instruction for the additional synchronization. The instruction for the additional synchronization may include information on the restoration reference block number.

First, in a case where the triggering command includes the instruction for the data transmission without the instruction for the additional synchronization, the specific delayed node 100-1 stops the delayed synchronization, and transmits the information on the delayed blocks included therein to the service nodes 200-1 to 200-N. And, in a case where the triggering command includes both the instruction for the data transmission and the instruction for the additional synchronization, the specific delayed node 100-1 stops the delayed synchronization, performs the additional synchronization by referring to the restoration reference block number, and transmits information on the incorporated blocks to the service nodes 200-1 to 200-N. A detailed explanation is omitted as it can be easily understood by referring to the first example embodiment.

Performing the restoration of the blockchain network with the aforementioned methods has an advantage in a processing speed, since a process of obtaining the backup data has been recorded on the blockchain network, and processes of transmitting the backup data are performed by the synchronization in the blockchain network or by commands on OS level.

The present disclosure has an effect of providing the method for the synchronizations with the delayed data, to thereby restore the service nodes while maintaining the reliability of the backup data.

The present disclosure has another effect of providing a prompt and easy method for the synchronizations with delayed data, to thereby restore one or more service nodes in the blockchain network while maintaining a reliability of the backup data to an administrator.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for synchronizations with delayed data serving as backup data stored in delayed nodes in a blockchain network, to thereby restore service nodes in the blockchain network while maintaining a reliability of the backup data, comprising steps of:
(a) a specific delayed node among the delayed nodes performing delayed synchronization, wherein the delayed synchronization represents synchronization with the services nodes while the specific delayed node maintains a specific delay according to a specific initial setting thereof;
(b) the specific delayed node, when a triggering command is acquired from an administrating device, transmitting information on delayed blocks included therein to the service nodes in order to support restoration of the service nodes; and
(c) the specific delayed node, after the service nodes are restored by using the information on the delayed blocks, performing the delayed synchronization again with the service nodes,
wherein, at the step of (b), the specific delayed node, by referring to a restoration reference block number in the triggering command and a recent delayed block number, wherein the restoration reference block number represents a number of a most recent block before an error occurs, in the service nodes, and wherein the recent delayed block number represents the number of the most recent block of the specific delayed node, performs
(i) a process of stopping the delayed synchronization and transmitting the information on the delayed blocks included in the specific delayed node to the service nodes in a first case, wherein the first case represents a case in which the restoration reference block number corresponds to the recent delayed block number, and
(ii) a process of stopping the delayed synchronization, performing additional synchronization with the service nodes, and transmitting information on incorporated blocks to the service nodes in a second case, wherein the second case represents a case in which the restoration reference block number is bigger than the recent delayed block number, wherein the additional synchronization represents synchronization with the service nodes by obtaining additional blocks comprised of from a subsequent block of a recent delayed block to a restoration reference block, and wherein the incorporated blocks represent blocks comprised of the delayed blocks of the specific delayed node and the additional blocks.

2. The method of claim 1, wherein, at the step of (b), in the second case, during the process of performing the additional synchronization with the service nodes, the specific delayed node acquires the additional blocks from the service nodes.

3. The method of claim 1, wherein each of the delayed nodes is set by the administrating device to have each of delays, and wherein the administrating device restores the blockchain network by transmitting the triggering command to at least one of the delayed nodes.

4. A method for synchronizations with delayed data serving as backup data stored in delayed nodes in a blockchain network, to thereby restore service nodes in the blockchain network while maintaining a reliability of the backup data, comprising steps of:

(a) a specific delayed node among the delayed nodes performing delayed synchronization, wherein the delayed synchronization represents synchronization with the services nodes while the specific delayed node maintains a specific delay according to a specific initial setting thereof;

(b) the specific delayed node, when a triggering command is acquired from an administrating device, transmitting information on delayed blocks included therein to the service nodes in order to support restoration of the service nodes; and (c) the specific delayed node, after the service nodes are restored by using the information on the delayed blocks, performing the delayed synchronization again with the service nodes, wherein, at the step of (b), the specific delayed node performs (i) a process of stopping the delayed synchronization and transmitting the information on the delayed blocks included therein to the service nodes in a first case, wherein the first case represents a case in which the triggering command includes, as the triggering command, an instruction for data transmission without an instruction for additional synchronization, and (ii) a process of stopping the delayed synchronization, performing, by referring to a restoration reference block number in the triggering command, the additional synchronization, and transmitting information on incorporated blocks to the service nodes in a second case, wherein the second case represents a case in which the triggering command includes, as the triggering command, both the instruction for the data transmission and the instruction for the additional synchronization, wherein the restoration reference block number represents a number of a most recent block before an error occurs, in the service nodes, wherein the additional synchronization represents synchronization with the service nodes by obtaining additional blocks comprised of from a subsequent block of a most recent block of the specific delayed node to a restoration reference block, and wherein the incorporated blocks represent blocks comprised of the delayed blocks of the specific delayed node and the additional blocks.

5. A method for synchronizations with delayed data serving as backup data stored in delayed nodes in a blockchain network, to thereby restore service nodes in the blockchain network while maintaining a reliability of the backup data, comprising steps of:

(a) a specific service node among the service nodes stopping routine synchronization among the service nodes when a first triggering command is acquired from an administrating device;

(b) after at least one specific delayed node among the delayed nodes acquires a second triggering command from the administrating device and, in response to the second triggering command, the specific delayed node transmits information on delayed blocks to the service nodes, the specific service node, by referring to a restoration reference block number in the second triggering command and a recent delayed block number, wherein the restoration reference block number represents a number of a most recent block before an error occurs, in the service nodes, and wherein the recent delayed block number represents the number of the most recent block of the specific delayed node, acquiring (i) the information on the delayed blocks from the specific delayed node in a first case, wherein the first case represents a case in which the restoration reference block number corresponds to the recent delayed block number, and (ii) information on incorporated blocks in a second case, wherein the second case represents a case in which the restoration reference block number is bigger than the recent delayed block number, and wherein the incorporated blocks represent blocks comprised of the delayed blocks of the specific delayed node and from a subsequent block of the recent delayed block number to a restoration reference block, to thereby complete an updated data chain; and (c) the specific service node restarting the routine synchronization when a third triggering command is acquired from the administrating device.

6. The method of claim 5, wherein, at the step of (b), the specific service node performs one of processes of (i) initializing itself, and performing restoration synchronization, to thereby complete the updated data chain, wherein the restoration synchronization represents synchronization with the specific delayed node to restore the specific service node by acquiring information on either the delayed blocks or the incorporated blocks, and (ii) initializing itself, and acquiring, by using commands supported on each of operating systems of the specific service node and the specific delayed node, information on data and structure of either the delayed blocks or the incorporated blocks interlocked with one another in a form of a linked list, to thereby create the updated data chain.

7. A specific delayed node, among delayed nodes in a blockchain network, which performs synchronizations with delayed data serving as backup data stored in the delayed nodes, to thereby restore service nodes in the blockchain network while maintaining a reliability of the backup data, comprising:

at least one memory that stores instructions; and
at least one processor configured to execute the instructions to perform or support another device to perform:

(I) a process of performing delayed synchronization, wherein the delayed synchronization represents synchronization with the services nodes while the processor maintains a specific delay according to a specific initial setting thereof, (II) a process of, when a triggering command is acquired from an administrating device, transmitting information on delayed blocks included therein to the service nodes in order to support restoration of the service nodes, and (III) a process of, after the service nodes are restored by using the information on the delayed blocks, performing the delayed synchronization again with the service nodes, wherein, at the process of (II), the processor, by referring to a restoration reference block number in the triggering command and a recent delayed block number, wherein the restoration reference block number represents a number of a most recent block before an error occurs, in the service nodes, and wherein the recent delayed block number represents the number of the most recent block of the specific delayed node, performs (i) a process of stopping the delayed synchronization and transmitting the information on the delayed blocks included in the specific delayed node to the service nodes in a first case, wherein the first case represents a case in which the restoration reference block number corresponds to the recent delayed block number, and (ii) a process of stopping the delayed synchronization, performing additional synchronization with the service nodes, and transmitting information on incorporated blocks to the service nodes in a second case, wherein the second case represents a case in which the restoration reference block number is bigger than the recent delayed block number, wherein the additional synchronization represents synchronization with the service nodes by obtaining additional blocks comprised of from a subsequent block of a recent delayed block to a restoration reference block, and wherein the incorporated blocks represent blocks comprised of the delayed blocks of the specific delayed node and the additional blocks.

8. The specific delayed node of claim 7, wherein, at the process of (II), in the second case, during the process of performing the additional synchronization with the service nodes, the processor acquires the additional blocks from the service nodes.

9. The specific delayed node of claim 7, wherein each of the delayed nodes is set by the administrating device to have each of delays, and wherein the administrating device restores the blockchain network by transmitting the triggering command to at least one of the delayed nodes.

10. A specific delayed node, among delayed nodes in a blockchain network, which performs synchronizations with delayed data serving as backup data stored in the delayed nodes, to thereby restore service nodes in the blockchain network while maintaining a reliability of the backup data, comprising:

at least one memory that stores instructions; and
at least one processor configured to execute the instructions to perform or support another device to perform:
(I) a process of performing delayed synchronization, wherein the delayed synchronization represents synchronization with the services nodes while the processor maintains a specific delay according to a specific initial setting thereof,
(II) a process of, when a triggering command is acquired from an administrating device, transmitting information on delayed blocks included therein to the service nodes in order to support restoration of the service nodes, and (III) a process of, after the service nodes are restored by using the information on the delayed blocks, performing the delayed synchronization again with the service nodes, wherein, at the process of (II), the processor performs
(i) a process of stopping the delayed synchronization and transmitting the information on the delayed blocks included therein to the service nodes in a first case, wherein the first case represents a case in which the triggering command includes, as the triggering command, an instruction for data transmission without an instruction for additional synchronization, and (ii) a process of stopping the delayed synchronization, performing, by referring to a restoration reference block number in the triggering command, the additional synchronization, and transmitting information on incorporated blocks to the service nodes in a second case, wherein the second case represents a case in which the triggering command includes, as the triggering command, both the instruction for the data transmission and the instruction for the additional synchronization, wherein the restoration reference block number represents a number of a most recent block before an error occurs, in the service nodes, wherein the additional synchronization represents synchronization with the service nodes by obtaining additional blocks comprised of from a subsequent block of a most recent block of the specific delayed node to a restoration reference block, and wherein the incorporated blocks represent blocks comprised of the delayed blocks of the specific delayed node and the additional blocks.

11. A specific service node, among service nodes in a blockchain network, which performs synchronizations with delayed data serving as backup data stored in delayed nodes in the blockchain network, to thereby restore the service nodes while maintaining a reliability of the backup data, comprising:

at least one memory that stores instructions; and
at least one processor configured to execute the instructions to perform or support another device to perform:
(I) a process of stopping routine synchronization among the service nodes when a first triggering command is acquired from the administrating device, (II) after at least one specific delayed node among the delayed nodes acquires a second triggering command from the administrating device and, in response to the second triggering command, the specific delayed node transmits information on delayed blocks to the service nodes, a process of, by referring to a restoration reference block number in the second triggering command and a recent delayed block number, wherein the restoration reference block number represents a number of a most recent block before an error occurs, in the service nodes, and wherein the recent delayed block number represents the number of the most recent block of the specific delayed node, acquiring (i) the information on the delayed blocks from the specific delayed node in a first case, wherein the first case represents a case in which the restoration reference block number corresponds to the recent delayed block number, and (ii) information on the incorporated blocks in a second case, wherein the second case represents a case in which the restoration reference block number is bigger than the recent delayed block number, and wherein the incorporated blocks represent blocks comprised of the delayed blocks of the specific delayed node and from a subsequent block of the recent delayed block number to a restoration reference block, to thereby complete an updated data chain, and (III) a process of restarting the routine synchronization when a third triggering command is acquired from the administrating device.

12. The specific service node of claim 11, wherein, at the process of (II), the processor performs one of processes of (i) initializing itself, and performing restoration synchronization, to thereby complete the updated data chain, wherein the restoration synchronization represents synchronization with the specific delayed node to restore the specific service node by acquiring information on either the delayed blocks or the incorporated blocks, and (ii) initializing itself, and acquiring, by using commands supported on each of operating systems of the specific service node and the specific delayed node, information on data and structure of either the delayed blocks or the incorporated blocks interlocked with one another in a form of a linked list, to thereby create the updated data chain.

* * * * *